(12) United States Patent
Trif

(10) Patent No.: US 12,091,119 B2
(45) Date of Patent: Sep. 17, 2024

(54) RETAINING SYSTEM AND ENERGY SUPPLY SYSTEM, IN PARTICULAR FOR A TWO-WHEELER INCLUDING AN ELECTRIC DRIVE

(71) Applicant: Robert Bosch GmbH, Stuttgart (DE)

(72) Inventor: Christian Trif, Kusterdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 535 days.

(21) Appl. No.: 17/387,584

(22) Filed: Jul. 28, 2021

(65) Prior Publication Data
US 2022/0048586 A1 Feb. 17, 2022

(30) Foreign Application Priority Data

Aug. 12, 2020 (DE) .......................... 102020210198.1

(51) Int. Cl.
| | | |
|---|---|---|
| *B62J 43/20* | (2020.01) | |
| *B62J 6/16* | (2020.01) | |
| *B62J 43/13* | (2020.01) | |
| *B62M 6/45* | (2010.01) | |
| *B62M 6/90* | (2010.01) | |

(52) U.S. Cl.
CPC .................. *B62J 43/20* (2020.02); *B62J 6/16* (2013.01); *B62J 43/13* (2020.02); *B62M 6/45* (2013.01); *B62M 6/90* (2013.01)

(58) Field of Classification Search
CPC ..... B62J 43/20; B62J 6/16; B62J 43/13; B62J 43/10; B62M 6/45; B62M 6/90
See application file for complete search history.

(56) References Cited

U.S. PATENT DOCUMENTS

| | | | |
|---|---|---|---|
| 11,325,678 B2 * | 5/2022 | Wecker | .................. B62K 19/40 |
| 2018/0241022 A1 * | 8/2018 | Nishihara | ............... B60L 50/64 |
| 2019/0337588 A1 * | 11/2019 | Wecker | .................. B62K 19/40 |

FOREIGN PATENT DOCUMENTS

| | | |
|---|---|---|
| DE | 102018105710 A1 | 9/2018 |
| DE | 102018206821 A1 | 11/2019 |

* cited by examiner

*Primary Examiner* — Minnah L Seoh
*Assistant Examiner* — Marlon A Arce
(74) *Attorney, Agent, or Firm* — NORTON ROSE FULBRIGHT US LLP; Gerard A. Messina

(57) ABSTRACT

A retaining system for retaining and releasing an element, in particular an electrical energy store. The retaining system includes a mounting that is configured to accommodate and fix the element, the mounting being configured to removably accommodate the element in the mounting, and an intermediate element that is situated between the element and the mounting and configured to allow a damped motion, in particular for gentle accommodation, of the element in the mounting. The mounting includes a locking bar that is configured to be accommodated in a receptacle in a locking position, or the mounting includes a receptacle that is configured to accommodate a locking bar in a locking position.

17 Claims, 4 Drawing Sheets

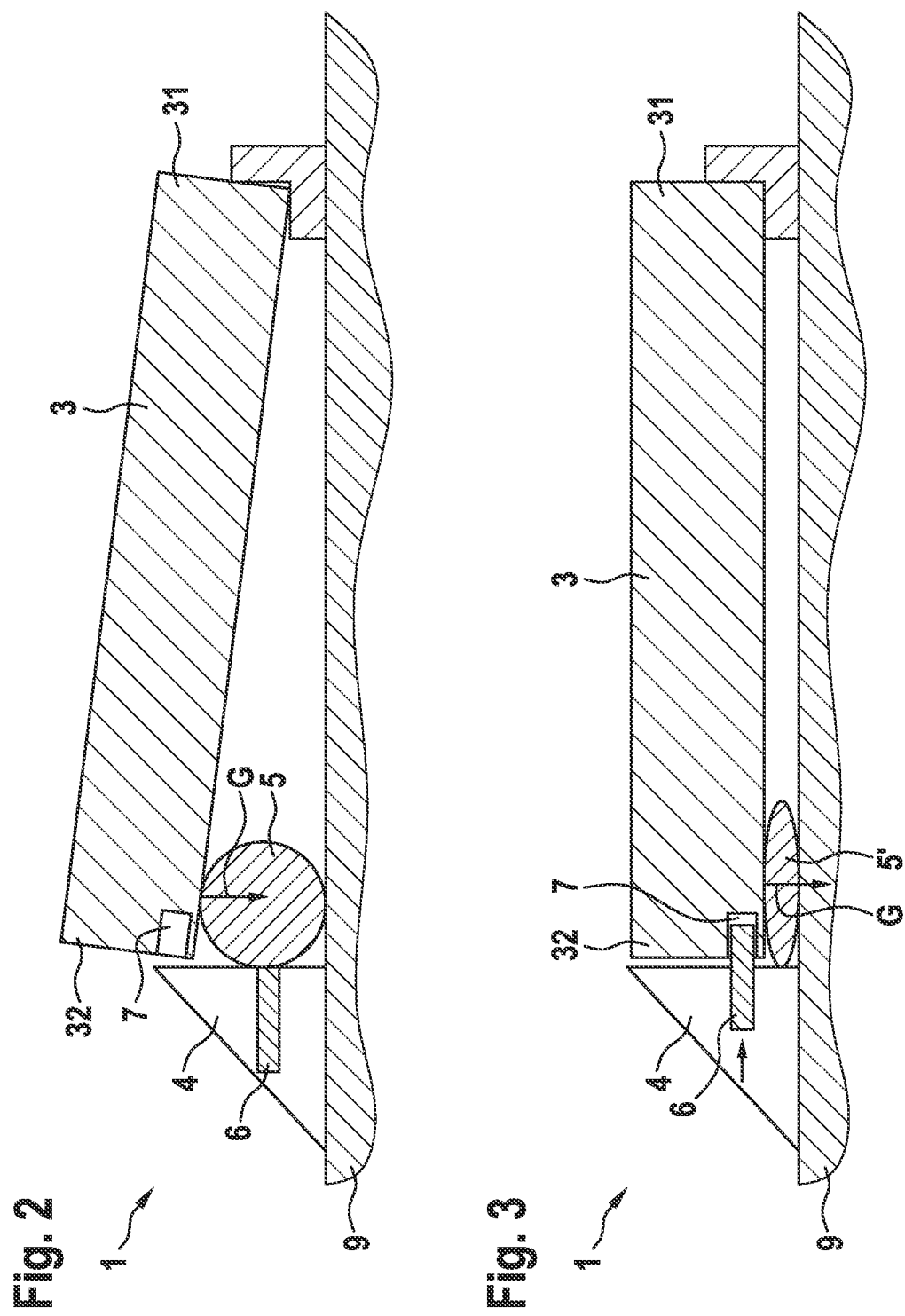

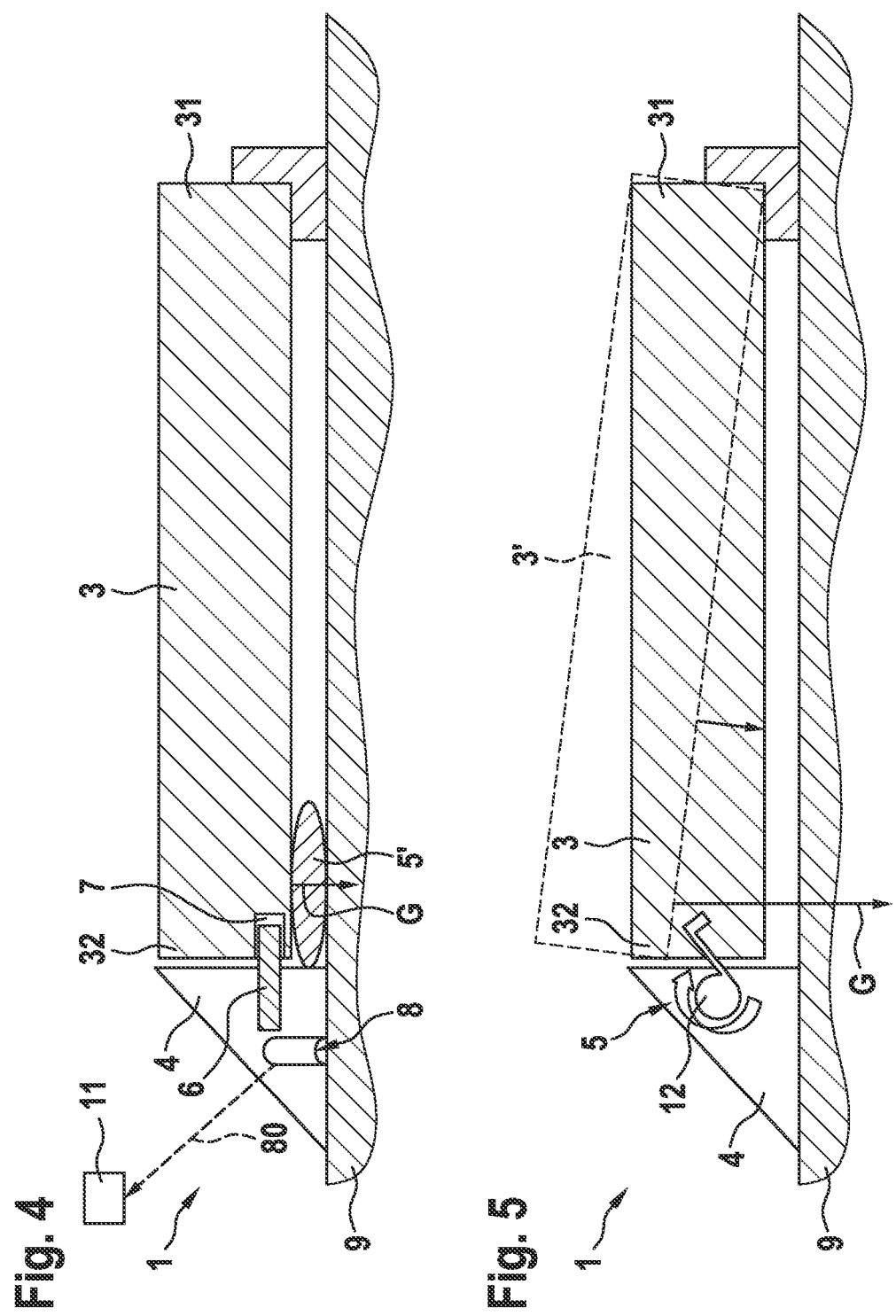

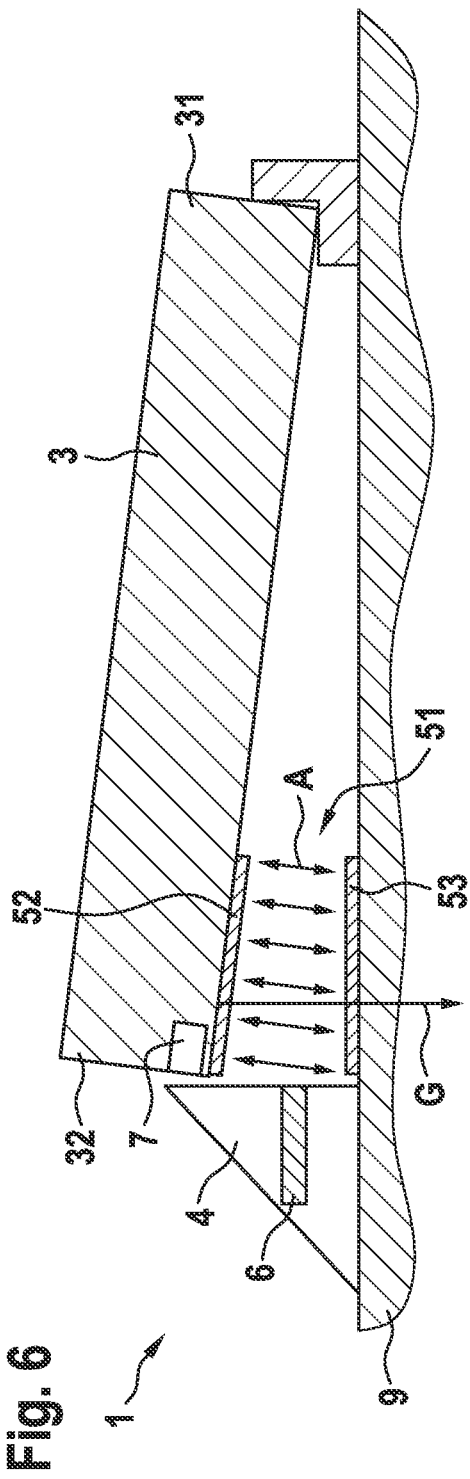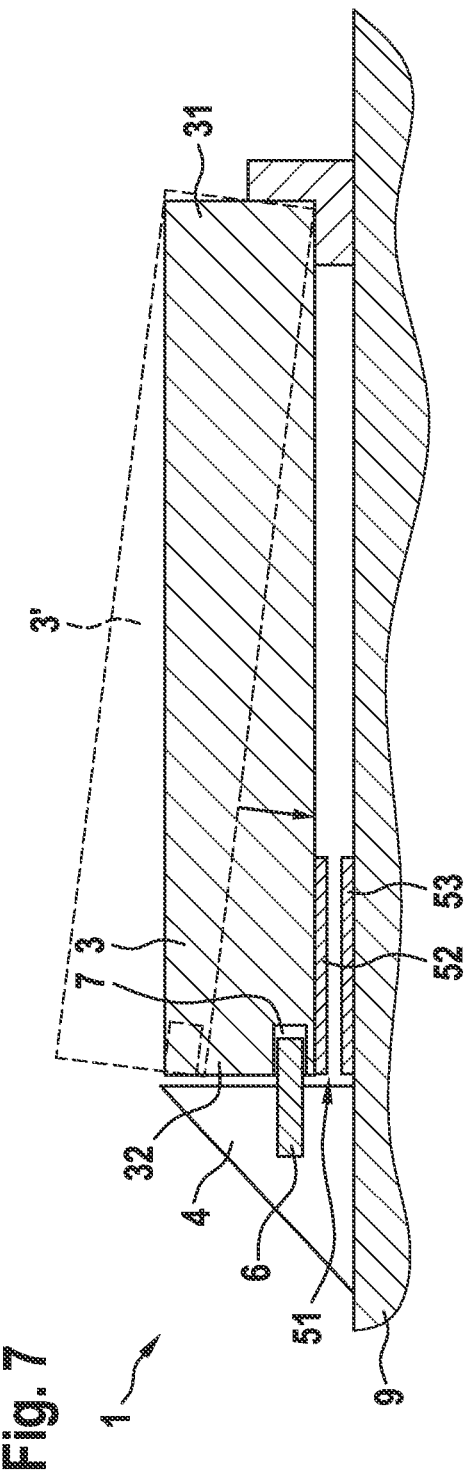

RETAINING SYSTEM AND ENERGY SUPPLY SYSTEM, IN PARTICULAR FOR A TWO-WHEELER INCLUDING AN ELECTRIC DRIVE

CROSS REFERENCE

The present application claims the benefit under 35 U.S.C. § 119 of German Patent Application No. DE 102020210198.1 filed on Aug. 12, 2020, which is expressly incorporated herein by reference in its entirety.

FIELD

The present invention relates to a retaining system and an energy supply system, in particular of a two-wheeler with an electric drive, such as a pedelec or an E-bike, in which in addition to a muscular power-based drive, an electric drive may have an assisting and/or an exclusive action. Moreover, the present invention relates to a two-wheeled vehicle that includes such an energy supply system.

BACKGROUND INFORMATION

In such bicycle-based two-wheeled vehicles, the electrical energy store is often removable from a mounting to allow easy replacement and/or charging of the electrical energy store. The mounting is typically situated at a frame or carrier or the like of the two-wheeled vehicle. Insertion of the electrical energy store into the mounting takes place, for example, by swiveling in, sliding in, or screwing in. The electrical energy store may subsequently be locked to the mounting with the aid of a lock, for example, to allow securing of the energy store and to prevent unauthorized removal of the energy store. Inserting the energy store into the mounting sometimes requires great strength, for example due to the fact that a locking bar must be pressed to the rear, and engagement of the locking bar does not take place until it has covered a certain distance by snapping it into a locking position. Users may have to apply great strength to introduce the electrical energy store into the mounting. However, for this reason there is a risk in particular that electrical contacts between the electrical energy store and the mounting may be damaged, and the energy supply system may no longer be able to deliver electrical power.

SUMMARY

A retaining system in accordance with the present invention may have an advantage over the related art that insertion and removal of an element, in particular an electrical energy store, into or from a mounting is very soft and gentle, and in particular is possible without damaging components of the element and of the mounting. In addition, with the retaining system according to the present invention it may be ensured that work to be done, which is necessary to bring the element in the mounting into its locked end position, is very small or is taken over by the element itself or a weight force of the element. As a result, it is not necessary for a user to exert force on the element when inserting it into the mounting, so that damage may be avoided. Furthermore, a design may be such that a user has to apply only small forces in addition to the weight force. It may thus be ensured according to the present invention that a secure connection between the element, for example the electrical energy store, and the mounting is always achieved in the inserted state. This is achieved according to an example embodiment of the present invention in that the retaining system, in addition to the mounting for retaining the element, includes an intermediate element situated between the element and the mounting. The intermediate element is configured to carry out a damped motion during the insertion, so that gentle accommodation of the element in the mounting is possible. The element may thus be gently accommodated in and removed from the mounting by a user with little or no effort. The intermediate element is thus a damping element. The mounting also includes a locking bar that is configured to be accommodated in a receptacle in a locking position, or the mounting includes a receptacle that is configured to accommodate a locking bar in a locking position in order to provide the locked state between the element and the mounting.

Preferred refinements of the present invention are disclosed herein.

In accordance with an example embodiment of the present invention, the intermediate element between the element and the mounting is preferably a deformable damping element. The deformable damping element is configured to damp a motion during insertion of the element into the mounting via self-deformation, and thus to ensure gentle accommodation of the element.

The deformable damping element is preferably configured to be deformed solely by a weight force of the element. Thus, for introducing the element into the mounting, a user only has to insert it into the mounting, and the retaining system automatically enables locking due to the weight force of the element. It is noted that a user may preferably also have to apply a small force in order to achieve a locking position of the element in the retaining system.

The deformable damping element is preferably an elastic plastic or an elastic foam. The deformable damping element may thus be provided in a very easy and cost-effective manner. Alternatively, the deformable damping element is a spring element or a vulcanized rubber or natural rubber element.

The deformable damping element is preferably situated at a first end of the element, between the element and the mounting.

According to one alternative embodiment of the present invention, the intermediate element is a magnet system that includes at least one permanent magnet. A damped motion and a gentle insertion of the element into the mounting may likewise be enabled by an appropriate selection of a magnetic force. The magnet system preferably includes exactly two permanent magnets, one of the permanent magnets being situated at the insertable element, and the other of the permanent magnets being situated at the mounting.

The magnet system particularly preferably also includes a deformable damping element via which a gentle insertion of the element may be further influenced in the desired manner.

It is further preferred that the retaining system includes a lock that is configured to release and to block the locking bar of the mounting. Unauthorized removal of the element from the mounting may be prevented by the lock. Furthermore, additional securing of the element in the mounting is possible.

According to a further preferred embodiment of the present invention, the retaining system also includes an auxiliary drive that is configured to actuate the locking bar of the mounting, and/or the auxiliary drive is configured to gently bring an element, loosely inserted into the mounting, into a locking position. The auxiliary drive is preferably an electric auxiliary drive, or alternatively, a crank that is actuatable by hand, or the like. Due to providing the auxiliary drive, a defined force may also be applied for moving the element into an end position in the mounting.

The locking bar of the mounting is preferably situated directly at the mounting, and the receptacle, for example an opening corresponding to a geometric shape of the locking bar, is situated at the element, in particular at the electrical energy store.

According to a further preferred embodiment of the present invention, the retaining system also includes a switch that is configured to emit a locking signal. The locking signal is emitted when the locking bar is in a predetermined end position in the receptacle. Thus, for example, it may be communicated to a control unit of the electric drive of the two-wheeled vehicle when the electrical energy store is correctly inserted into the mounting and the system may be supplied with electrical energy. Only then may the control unit be configured to supply the electric drive of the two-wheeled vehicle with electrical energy.

Moreover, the present invention relates to an energy supply system of a vehicle, in particular a two-wheeled vehicle including an electric drive, an electrical energy store, and a retaining system according to the present invention.

Furthermore, the present invention relates to a two-wheeled vehicle, in particular a bicycle with an electric drive, including an energy supply system according to the present invention and/or a retaining system according to the present invention.

The element to be accommodated in the retaining system, in addition to an electrical energy store, may also be, for example, a box for valuables or a drinking bottle or the like.

The two-wheeled vehicle preferably includes a frame, the mounting being situated at the frame and/or partially or completely integrated into the frame. The mounting may be situated, for example, at a down tube of the two-wheeled vehicle or in the area of a carrier or a seat tube.

In addition, the two-wheeled vehicle includes a control unit for controlling the electric drive of the two-wheeled vehicle, the control unit being configured to carry out the control of the electric drive only when a switch at the mounting has sent an appropriate locking signal that signals a correct end position of the electrical energy store in the mounting.

The two-wheeled vehicle is preferably a pedelec that is drivable with the aid of muscular power and/or electrically, or an E-bike that is drivable only electrically. It is noted that according to the present invention, a bicycle-like vehicle with three or four wheels is also understood to mean a two-wheeled vehicle.

BRIEF DESCRIPTION OF THE DRAWINGS

Preferred exemplary embodiments of the present invention are described in greater detail below with reference to the figures.

FIG. 2 shows a schematic, partially cut-away side view of the energy supply system from FIG. 1 in the unengaged state.

FIG. 3 shows a schematic, partially cut-away side view of the energy supply system from FIG. 1 in the engaged state.

FIG. 4 shows a schematic, partially cut-away view of an energy supply system according to a second exemplary embodiment of the present invention in the engaged state.

FIG. 5 shows a schematic illustration of an insertion operation for an energy supply system according to a third exemplary embodiment of the present invention.

FIGS. 6 and 7 show a schematic, partially cut-away view of an energy supply system in the unengaged and engaged states according to a fourth exemplary embodiment of the present invention.

DETAILED DESCRIPTION OF EXAMPLE EMBODIMENTS

Figure 1:
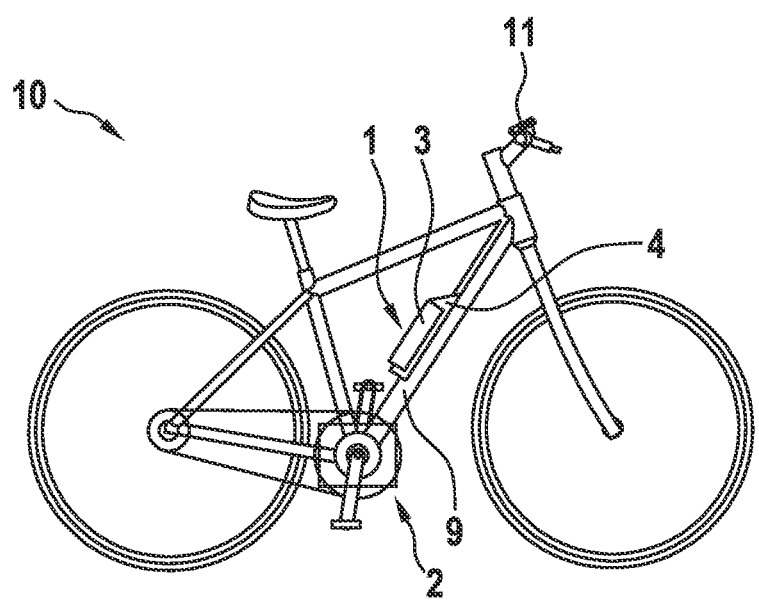
FIG. 1 shows a schematic view of a two-wheeled vehicle, including a retaining system and an energy supply system according to a first exemplary embodiment of the present invention.

A retaining system and an energy supply system 1 of a two-wheeled vehicle 10 according to a first preferred exemplary embodiment of the present invention are described in greater detail below with reference to FIGS. 1 through 3.

FIG. 1 schematically shows two-wheeled vehicle 10, which in this exemplary embodiment is a pedelec. Two-wheeled vehicle 10 includes an electric drive 2 situated in the area of a bottom bracket of the two-wheeled vehicle. In addition, an energy supply system 1 including an electrical energy store 3 and the retaining system with a mounting 4 are situated at a frame 9. Mounting 4 is partially positioned in frame 9, so that electrical energy store 3 in the inserted state is also partially situated in frame 9.

Two-wheeled vehicle 10 also includes a control unit 11 that activates electric drive 2 corresponding to the rider's intent in order to obtain pedal assistance from the two-wheeled vehicle.

FIGS. 2 and 3 schematically show energy supply system 1. Electrical energy store 3 is removably situated in mounting 4, which is fixed to frame 9. FIG. 2 shows the beginning of an operation for inserting the electrical energy store into mounting 4.

The retaining system also includes, in addition to mounting 4, an intermediate element 5 that is situated between electrical energy store 3 and mounting 4. The intermediate element is configured to carry out a uniform motion for gentle accommodation of electrical energy store 3 in mounting 4. Gentle accommodation is thus understood to mean a steady motion, for example. It may also be understood to mean a uniform motion that may also have an increasingly accelerating or in particular a decelerating character. The insertion speed is thus reduced, or predefined to an extent that prevents damage and in particular allows secure contacting.

Electrical energy store 3 has a first end 31 and a second end 32. As is apparent from FIG. 2, intermediate element 5 is situated between electrical energy store 3 and mounting 4 at second end 32 of electrical energy store 3. First end 31 of the electrical energy store is the end that is first inserted into mounting 4.

Mounting 4 also includes a locking bar 6, and a receptacle 7 that is configured to hold locking bar 6. Locking bar 6 is a cylindrical pin, for example, and receptacle 7 is an opening having a corresponding design. As is apparent from FIG. 2, locking bar 6 is situated at mounting 4, and receptacle 7 is situated at electrical energy store 3 at second end 32. However, it is noted that it is also possible for locking bar 6 and receptacle 7 to be situated at the respective other component.

In the first exemplary embodiment, intermediate element 5 is a deformable damping element, for example an elastic foam. FIG. 2 shows the undeformed state of intermediate element 5, and FIG. 3 schematically shows the deformed state of intermediate element 5, which is denoted by reference numeral 5' in FIG. 3.

Electrical energy store 3 includes multiple single cells, for example lithium-ion cells in various forms, which are framed and enclosed by a housing. The electrical energy store thus has a certain weight. As indicated in FIG. 2, after the insertion of electrical energy store 3 with first end 31 into mounting 4, the further insertion operation automatically takes place via the weight force of electrical energy store 3 at second end 32, as indicated by arrow G in FIGS. 2 and 3. As a result, elastic intermediate element 5 deforms, and locking bar 6 may be slid into receptacle 7. This may take place automatically via a snap-in operation, for example, when locking bar 6 is spring-loaded, for example, and during the insertion operation for electrical energy store 3 is slid back, and as soon as receptacle 7 is at the engagement position, may then be moved into the engaged position due to the pretensioning.

Thus, a user him/herself does not have to do work to place mobile electrical energy store 3 in mounting 4. The motion of electrical energy store 3 into the end position shown in FIG. 3 is achieved solely by the weight force of electrical energy store 3. As a result, electrical contacts that are present at electrical energy store 3 and mounting 4, and that are electrically contacted in the end position shown in FIG. 3, also cannot be damaged by an insertion operation for electrical energy store 3. Alternatively, it may also be provided that a user has to apply a small force in order to press the energy store into the end position in the mounting.

FIG. 4 shows an energy supply system 1 including a retaining system according to a second exemplary embodiment of the present invention. Identical or functionally equivalent parts are denoted by the same reference numerals as in the first exemplary embodiment.

The second exemplary embodiment essentially corresponds to the first exemplary embodiment, in contrast to the first exemplary embodiment, in the second exemplary embodiment a switch 8 additionally being provided at mounting 4. The task of switch 8 is to send a locking signal 80 to control unit 11 after a correct locking of electrical energy store 3 in mounting 4. Control unit 11 is configured to supply electric drive 2 of the two-wheeled vehicle with electrical energy only when this locking signal 80 has been sent. It may thus be ensured that electric drive 2 of the two-wheeled vehicle may be operated only when electrical energy store 3 is correctly inserted. The signal transmission may take place via a cable, WiFi, Bluetooth, or some other transmission method. In addition, a query by switch 8 as to whether locking bar 6 is correctly positioned in receptacle 7 in electrical energy store 3 may take place inductively, capacitively, tactilely, or visually. Otherwise, the second exemplary embodiment corresponds to the first exemplary embodiment, so that reference may be made to the description provided in connection with the first exemplary embodiment.

FIG. 5 shows an energy supply system 1 including a retaining system according to a third exemplary embodiment of the present invention. Identical or functionally equivalent parts are denoted by the same reference numerals as in the first exemplary embodiment.

Energy supply system 1 of the third exemplary embodiment includes an auxiliary drive 12 as an intermediate element. In this exemplary embodiment, auxiliary drive 12 is a hand crank. However, it is also possible for auxiliary drive 12 to be a small electric motor. The hand crank or a small electric motor may take over the task of gently bringing electrical energy store 3 from starting position 3', depicted in dashed lines in FIG. 5, into the locked end position. Optionally, the locking may also take place directly via hand crank 12 or the small electric motor. It is noted that an additional damping element, corresponding to the first or second exemplary embodiment, is optionally also provided between electrical energy store 3 and mounting 4.

FIGS. 6 and 7 show an energy supply system 1 including a retaining system according to a fourth exemplary embodiment of the present invention. Identical or functionally equivalent parts are denoted as in the preceding exemplary embodiments.

The fourth exemplary embodiment includes a magnet system 51 as an intermediate element 5 between electrical energy store 3 and mounting 4.

Magnet system 51 includes a first permanent magnet 52 and a second permanent magnet 53. First permanent magnet 52 is situated at electrical energy store 3, and second permanent magnet 53 is situated at mounting 4 or at frame 9. As shown in FIG. 6, when electrical energy store 3 is inserted with first end 31 into mounting 4, electrical energy store 3 is attracted by the magnetic force provided by permanent magnets 52, 53, as indicated by arrows A in FIG. 6. Electrical energy store 3 is thus brought into the end position shown in FIG. 7. By an appropriate selection of the permanent magnets, the magnetic attractive force may be predetermined so that a slow motion of electrical energy store 3 into mounting 4 is made possible. It is noted that magnet system 51 may also be designed in such a way that only one permanent magnet is situated at electrical energy store 3 or at mounting 4, and an iron-containing component is provided at the other component, or optionally is present anyway in the particular component. The cost of the magnet system may be greatly reduced in this way.

In a further exemplary embodiment, it may be provided that magnet system 51 and in particular magnet 53 is activated at frame 9 or at mounting 4 in such a way that a repulsive magnetic field is initially generated when energy store 3 is inserted. This magnetic field may interact with a magnet 52 at the energy store or with the metallic housing of energy store 3, so that a force must be initially applied in order to completely introduce the energy store into frame 9 or mounting 4. Of course, it may also be provided that magnet 52 generates this repulsive magnetic field at energy store 3.

In a further embodiment, it may be provided that the attractive or repulsive force is controlled. The attractive force may thus initially be only weak, and increases with increasing proximity of energy store 3 in frame 9 or mounting 4. Correspondingly, it may be provided that the repulsive force decreases with the insertion of the energy store the closer that energy store 3 is to reaching its end position in frame 9 or mounting 4. Optionally, a sensor may be provided which detects the instantaneous position or the distance from the end position. The sensor variable detected in this way may be used to control the magnetic force or the repulsive force. Possible sensors are optical sensors, for example a light sensor or a detection of a reflected light beam, as well as a pressure sensor. This type of sensor is advantageously mounted at the base of frame 9 or in the lower area of mounting 4 in the vicinity of the base.

With regard to all exemplary embodiments, it is noted that a lock may of course also be provided at mounting 4 in order to secure the locked state of electrical energy store 3 in mounting 4. In addition, with regard to all exemplary embodiments it is noted that locking bar 6 may be inserted into receptacle 7 manually or with the aid of a pretensioning force, for example via a spring element. For this purpose, a bevel, for example, may also be provided at electrical energy store 3 to achieve a motion of locking bar 6 against the pretensioning force during the insertion operation.

In a further embodiment, it may be provided that the above-described intermediate element or the damping element is situated at the electrical energy store.

What is claimed is:

1. A retaining system for retaining and releasing an element, which is an electrical energy store, comprising:
   a mounting configured to accommodate and fix the element, and configured to removably accommodate the element in the mounting;
   an intermediate element situated between the element and the mounting and configured to allow a damped motion for gentle accommodation of the element in the mounting; and
   a switch configured to emit a locking signal when a locking bar is positioned in a receptacle in a predetermined position;
   wherein the mounting includes the locking bar that is configured to be accommodated in the receptacle in a locking position, or the mounting includes the receptacle that is configured to accommodate the locking bar in the locking position.

2. The retaining system as recited in claim 1, wherein the intermediate element is a deformable damping element.

3. The retaining system as recited in claim 2, wherein the deformable damping element is configured to be deformed solely by a weight force of the electrical energy store.

4. The retaining system as recited in claim 2, wherein the deformable damping element is an elastic plastic or an elastic foam.

5. The retaining system as recited in claim 2, wherein the deformable damping element is a spring element or a vulcanized rubber or natural rubber element.

6. The retaining system as recited in claim 1, wherein the intermediate element is a magnet system that includes at least one permanent magnet.

7. The retaining system as recited in claim 1, further comprising:
   a lock configured to release and to block the locking bar in the receptacle.

8. The retaining system as recited in claim 1, wherein the intermediate element includes an auxiliary drive, the auxiliary drive being configured to bring the element, loosely inserted into the mounting, into a locking position, and/or the auxiliary drive being configured to bring the element out of the locking position.

9. The retaining system as recited in claim 1, wherein the predetermined position is a predetermined end position.

10. The retaining system as recited in claim 1, wherein the intermediate element includes an auxiliary drive, the auxiliary drive being configured to bring the element into a locking position, and/or the auxiliary drive being configured to bring the element out of the locking position, and wherein the auxiliary drive includes a mechanical drive or a motor drive.

11. A retaining system for retaining and releasing an element, the element being an electrical energy store, comprising:
   a mounting configured to accommodate and fix the element, and configured to removably accommodate the element in the mounting; and
   an intermediate element situated between the element and the mounting and configured to allow a damped motion for gentle accommodation of the element in the mounting;
   wherein the mounting includes a locking bar that is configured to be accommodated in a receptacle in a locking position, or the mounting includes the receptacle that is configured to accommodate the locking bar in a locking position,
   wherein the intermediate element is a magnet system that includes at least one permanent magnet, and
   wherein the magnet system includes a first permanent magnet and a second permanent magnet, one of the first and second permanent magnets being situated at the element, and the other of the first and second permanent magnets being situated at the mounting.

12. An energy supply system, comprising:
   an electrical energy store; and
   a retaining system for retaining and releasing the electrical energy store, the system including:
      a mounting configured to accommodate and fix the electrical energy store, the mounting being configured to removably accommodate the electrical energy store in the mounting;
      an intermediate element situated between the electrical energy store and the mounting and configured to allow a damped motion for gentle accommodation of the electrical energy store in the mounting; and
      a switch configured to emit a locking signal when a locking bar is positioned in a receptacle in a predetermined position;
      wherein the mounting includes the locking bar that is configured to be accommodated in the receptacle in a locking position, or the mounting includes the receptacle that is configured to accommodate the locking bar in a locking positioning system.

13. A two-wheeled vehicle, comprising:
   an electric drive; and
   an energy supply system, the energy supply system including:
      an electrical energy store; and
      a retaining system for retaining and releasing the electrical energy store, the system including:
         a mounting configured to accommodate and fix the electrical energy store, the mounting being configured to removably accommodate the electrical energy store in the mounting;
         an intermediate element situated between the electrical energy store and the mounting and configured to allow a damped motion for gentle accommodation of the electrical energy store in the mounting; and
         a switch configured to emit a locking signal when a locking bar is positioned in a receptacle in a predetermined position;
         wherein the mounting includes the locking bar that is configured to be accommodated in the receptacle in a locking position, or the mounting includes the receptacle that is configured to accommodate the locking bar in a locking positioning system.

14. The two-wheeled vehicle as recited in claim 13, wherein the two-wheeled vehicle is a bicycle.

15. The two-wheeled vehicle as recited in claim 13, further comprising:
   a frame, the mounting being situated at the frame and/or being partially or completely integrated into the frame.

16. The two-wheeled vehicle as recited in claim 13, wherein the intermediate element includes an auxiliary drive, the auxiliary drive being configured to bring the element into a locking position, and/or the auxiliary drive being configured to bring the element out of the locking position, and wherein the auxiliary drive includes a mechanical drive or a motor drive.

17. A two-wheeled vehicle, comprising:
an electric drive; and
an energy supply system, the energy supply system including:
   an electrical energy store; and
   a retaining system for retaining and releasing the electrical energy store, the system including:
      a mounting configured to accommodate and fix the electrical energy store, the mounting being configured to removably accommodate the electrical energy store in the mounting; and
      an intermediate element situated between the electrical energy store and the mounting and configured to allow a damped motion for gentle accommodation of the electrical energy store in the mounting;
      wherein the mounting includes a locking bar that is configured to be accommodated in a receptacle in a locking position, or the mounting includes a receptacle that is configured to accommodate a locking bar in a locking positioning system; and
a control unit configured to activate the electric drive of the two-wheeled vehicle when a switch has transmitted a locking signal, which signals proper locking of the locking bar in the receptacle, to the control unit.

* * * * *